(12) United States Patent
Maruno et al.

(10) Patent No.: US 12,220,993 B2
(45) Date of Patent: Feb. 11, 2025

(54) VEHICLE, SERVER DEVICE, DISPLAY CONTROL METHOD, AND PROGRAM

(71) Applicant: HONDA MOTOR CO., LTD., Tokyo (JP)

(72) Inventors: Naoki Maruno, Wako (JP); Minoru Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 732 days.

(21) Appl. No.: 17/270,467

(22) PCT Filed: Jun. 10, 2019

(86) PCT No.: PCT/JP2019/022958
§ 371 (c)(1),
(2) Date: Feb. 23, 2021

(87) PCT Pub. No.: WO2020/044719
PCT Pub. Date: Mar. 5, 2020

(65) Prior Publication Data
US 2021/0323419 A1    Oct. 21, 2021

(30) Foreign Application Priority Data
Aug. 29, 2018   (JP) .................................. 2018-160289

(51) Int. Cl.
*B60L 58/16*   (2019.01)
*B60K 35/00*   (2006.01)
(Continued)

(52) U.S. Cl.
CPC .............. *B60L 50/66* (2019.02); *B60K 35/00* (2013.01); *B60L 58/16* (2019.02); *G06F 3/14* (2013.01);
(Continued)

(58) Field of Classification Search
CPC ...... B60L 50/66; B60L 58/16; B60L 2240/70; B60L 2250/16; B60L 2260/44;
(Continued)

(56) References Cited

U.S. PATENT DOCUMENTS

2017/0282739 A1   10/2017   Cha et al.
2018/0050601 A1   2/2018    Katanoda
(Continued)

FOREIGN PATENT DOCUMENTS

CN    107284241    10/2017
JP    2005-227141   8/2005
(Continued)

OTHER PUBLICATIONS

Japanese Notice of Allowance for Japanese Patent Application No. 2020-540082 mailed Jan. 11, 2022.
(Continued)

*Primary Examiner* — B M M Hannan
(74) *Attorney, Agent, or Firm* — Amin, Turocy & Watson, LLP

(57) ABSTRACT

A vehicle includes: a secondary battery configured to supply electric power for travel driving; a first communication unit configured to communicate with a server device and uploads information on the state of the secondary battery to the server device; a display unit configured to display images; and a display control unit configured to cause the display unit to display an image in which a deterioration degree of the secondary battery with respect to a mileage or the number of years run with respect to the vehicle can be compared with the result of statistically processing the deterioration degree of the secondary batteries with respect to a mileage or the number of years run with respect to other vehicles on the basis of the information that the first communication unit has received from the server device.

6 Claims, 10 Drawing Sheets

(51) Int. Cl.
*B60L 50/60* (2019.01)
*G06F 3/14* (2006.01)
*H01M 10/48* (2006.01)
*H02J 7/00* (2006.01)
*H04L 67/12* (2022.01)
*B60K 35/28* (2024.01)

(52) U.S. Cl.
CPC ........... *H01M 10/48* (2013.01); *H02J 7/0047* (2013.01); *H04L 67/12* (2013.01); *B60K 35/28* (2024.01); *B60K 2360/169* (2024.01); *H01M 2220/20* (2013.01)

(58) Field of Classification Search
CPC ...... B60L 2260/46; B60L 3/0046; B60L 3/12; B60K 35/00; B60K 2370/169; B60K 35/28; B60K 2360/169; B60K 35/10; B60K 35/85; B60K 35/22; G06F 3/14; H01M 10/48; H01M 2220/20; H01M 10/488; H01M 2010/4278; H02J 7/0047; H02J 2310/48; H04L 67/12; G09G 2380/10; Y02E 60/10; Y02T 10/70; Y02T 10/72; Y02T 90/16; Y02T 90/167; Y04S 30/12

USPC .......................................................... 701/22
See application file for complete search history.

(56) References Cited

U.S. PATENT DOCUMENTS

2018/0109121 A1* 4/2018 Uchida .................. B60L 58/21
2018/0248229 A1* 8/2018 Wada .................. H01M 10/425

FOREIGN PATENT DOCUMENTS

| JP | 2012-174102 | 9/2012 |
| JP | 2014-054083 | 3/2014 |
| JP | 2014-072932 | 4/2014 |
| JP | 2017-028874 | 2/2017 |
| JP | 2018-029430 | 2/2018 |

OTHER PUBLICATIONS

International Search Report and Written Opinion for International Application No. PCT/JP2019/022958 mailed on Sep. 10, 2019, 9 pages.
Chinese Office Action for Chinese Patent Application No. 201980042344.X mailed Mar. 13, 2024.

* cited by examiner

VEHICLE, SERVER DEVICE, DISPLAY CONTROL METHOD, AND PROGRAM

The present invention relates to a vehicle, a server device, a display control method, and a program.

Priority is claimed on Japanese Patent Application No. 2018-160289, filed on Aug. 29, 2018, the content of which is incorporated herein by reference.

BACKGROUND ART

Batteries (secondary batteries) such as lithium-ion batteries are used in electric vehicles such as electric cars and hybrid cars. Conventionally, a display device for displaying the deterioration degree of a battery used in an electric vehicle has been proposed (for example, see Patent Literature 1).

CITATION LIST

Patent Literature

[Patent Literature 1]
Japanese Unexamined Patent Publication No. 2017-28874

SUMMARY OF INVENTION

Technical Problem

In the future, it is expected that the use of secondary batteries will become widespread, and the state of batteries will greatly affect the selling price when buying and selling vehicles. Under such circumstances, it is considered that the user will be concerned about how to use the vehicle (the battery) so that the battery does not deteriorate as far as possible.

However, in the above-mentioned conventional display device, there is a problem that only the battery state of the host vehicle can be ascertained, and the level of the battery state of the host vehicle as compared with the battery state of other vehicles cannot be objectively ascertained.

Therefore, it may not be possible to motivate the user to use the vehicle (the battery) in such a way that the deterioration of the battery is minimized In addition, there is a problem that the user may not know how to use batteries to minimize deterioration.

Aspects according to the present invention have been made in view of such circumstances, and one object thereof is to provide a vehicle, a server device, a display control method, and a program capable of allowing the usage state of batteries to be observed objectively and displaying an appropriate method of using batteries according to the usage state.

Solution to Problem

The present invention employs the following aspects in order to solve these technical problems and achieve the above objects.

(1) A vehicle according to an aspect of the present invention is a vehicle including: a secondary battery configured to supply electric power for travel driving; a first communication unit configured to communicate with a server device and upload information on the state of the secondary battery to the server device; a display unit configured to display images; and a display control unit configured to cause the display unit to display an image in which a deterioration degree of the secondary battery with respect to a mileage or a number of the number of years run with respect to the vehicle can be compared with the result of statistically processing the deterioration degree of the secondary batteries with respect to a mileage or the number of years run with respect to other vehicles on the basis of the information that the first communication unit has received from the server device.

(2) In aspect (1), the display control unit may control the first communication unit such that it transmits a signal that requests transmitting information for minimizing deterioration of the secondary battery to the server device when the deterioration degree of the secondary battery with respect to a mileage or a number of the number of years run with respect to the vehicle is worse than a reference in a comparison using results of statistically processing the deterioration degree of secondary batteries with respect to a mileage or a number of the number of years run of other vehicles.

(3) A server device according to an aspect of the present invention is a server device including: a second communication unit configured to communicate with a vehicle having a secondary battery that supplies electric power for travel driving and a first communication unit that uploads information on the state of the secondary battery to the server device; and a processing unit configured to generate information for displaying an image in which a deterioration degree of the secondary battery with respect to a mileage or the number of years run by a target vehicle can be compared with the result of statistically processing the deterioration degree of secondary batteries with respect to a mileage or the number of years run with respect to other vehicles on the basis of the information that the second communication unit has received from a plurality of vehicles and control the second communication unit to transmit the generated information to the target vehicle.

(4) A server device according to an aspect of the present invention is a server device including: a second communication unit configured to communicate with a vehicle having a secondary battery that supplies electric power for travel driving and a first communication unit that uploads information on the state of the secondary battery to the server device; and a processing unit configured to determine whether the deterioration degree of the secondary battery with respect to the mileage or the number of years run of the target vehicle is worse than a reference as compared to the result of statistically processing the deterioration degree of the secondary batteries with respect to the mileage or the number of years run of the other vehicles on the basis of the information that the second communication unit has received from a plurality of vehicles and control the second communication unit to transmit information for minimizing deterioration of the secondary battery to the target vehicle when the deterioration degree is worse than a reference.

(5) A display control method according to an aspect of the present invention is a display control method executed using a computer mounted on a vehicle including a secondary battery configured to supply electric power for travel driving, a first communication unit configured to communicate with a server device and upload information on the state of the secondary battery to the server device, and a display unit configured to display images, including: generating an image in which a deterioration degree of the secondary battery with respect to a mileage or the number of years run with respect to the vehicle can be compared with the result of statistically processing the deterioration degree of the secondary batteries with respect to a mileage or the number of years run with respect to other vehicles on the basis of the information that the first communication unit has received from the server device; and displaying the generated image on the display unit.

(6) A program according to an aspect of the present invention is a program for causing a computer mounted on a vehicle including a secondary battery configured to supply electric power for travel driving, a first communication unit configured to communicate with a server device and upload information on the state of the secondary battery to the server device, and a display unit configured to display images to execute: generating an image in which a deterioration degree of the secondary battery with respect to a mileage or the number of years run with respect to the vehicle can be compared with the result of statistically processing the deterioration degree of the secondary batteries with respect to a mileage or the number of years run with respect to other vehicles on the basis of the information that the first communication unit has received from the server device; and displaying the generated image on the display unit.

(7) A display control method according to an aspect of the present invention is a display control method executed using a computer mounted on a server device including a second communication unit configured to communicate with a vehicle having a secondary battery that supplies electric power for travel driving and a first communication unit that uploads information on the state of the secondary battery, including: generating information for displaying an image in which a deterioration degree of the secondary battery with respect to a mileage or the number of years run by a target vehicle can be compared with the result of statistically processing the deterioration degree of secondary batteries with respect to a mileage or the number of years run with respect to other vehicles on the basis of the information that the second communication unit has received from a plurality of vehicles; and controlling the second communication unit to transmit the generated information to the target vehicle.

(8) A program according to an aspect of the present invention is a program for causing a computer mounted on a server device including a second communication unit configured to communicate with a vehicle having a secondary battery that supplies electric power for travel driving and a first communication unit that uploads information on the state of the secondary battery to a server device to execute: determining whether the deterioration degree of the secondary battery with respect to the mileage or the number of years run of the target vehicle is worse than a reference as compared to the result of statistically processing the deterioration degree of the secondary batteries with respect to the mileage or the number of years run of the other vehicles on the basis of the information that the second communication unit has received from a plurality of vehicles; and controlling the second communication unit to transmit information for minimizing deterioration of the secondary battery to the target vehicle when the deterioration degree is worse than a reference.

Advantageous Effects of Invention

According to the aspects of the present invention, it is possible to provide a vehicle, a server device, a display control method, and a program capable of allowing the usage state of batteries to be objectively and displaying an appropriate method of using batteries according to the usage state.

DESCRIPTION OF EMBODIMENTS

Hereinafter, an embodiment of a vehicle, a server device, a display control method, and a program according to the present invention will be described with reference to the drawings. In the following description, it is assumed that a vehicle 10 is an electric car, but the vehicle 10 may be a vehicle equipped with secondary batteries for supplying electric power for travel driving or may be a hybrid car or a fuel cell vehicle. Moreover, in the following description, it is assumed that a secondary battery and a battery are synonymous.

First Embodiment

[Overall Configuration]

Figure 1:
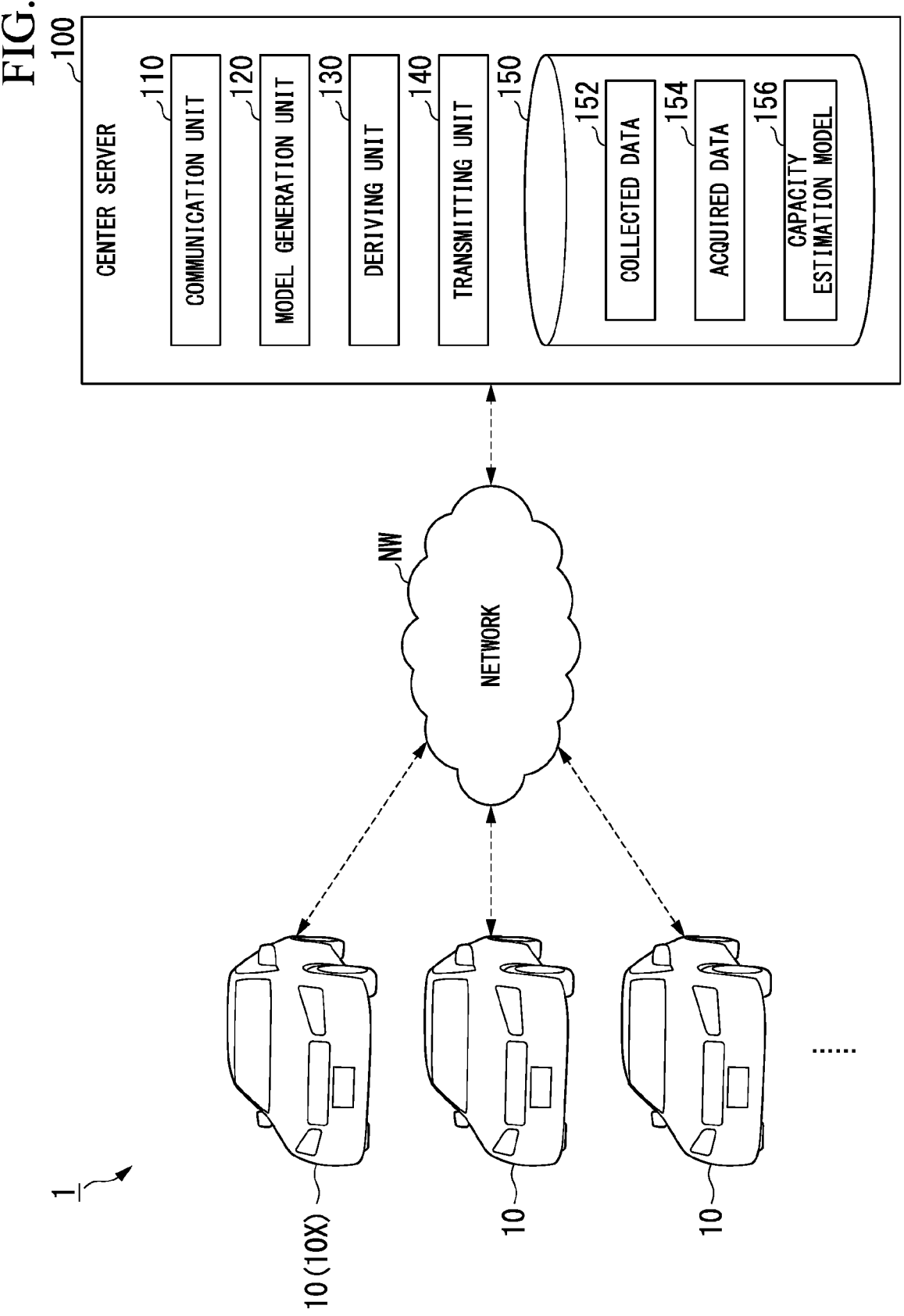
FIG. 1 is a diagram illustrating a configuration example of a presentation system 1.

FIG. 1 is a diagram illustrating a configuration example of a presentation system 1. The presentation system 1 is a system that presents a deviation value (a relative deterioration degree) of a deterioration degree in a battery (a secondary battery) mounted in a presentation target vehicle (hereinafter referred to as a "target vehicle" or a "host vehicle") 10X among a plurality of vehicles 10. As illustrated in FIG. 1, the presentation system 1 includes a plurality of vehicles 10 and a center server (a presentation device) 100. The center server 100 performs diagnosis on the battery mounted in the target vehicle 10X on the basis of information transmitted (uploaded) from the plurality of vehicles 10. Vehicles which are not the presentation target among the plurality of vehicles 10 are also referred to as "other vehicles".

The center server 100 calculates a relative deterioration degree for batteries mounted in the target vehicle 10X on the market on the basis of the battery diagnosis results and presents the relative deterioration degree to the user of the target vehicle 10X. The market refers to an area in which vehicles that provide data for calculating the deviation value of the deterioration degree are present and refers to an area determined on the basis of appropriate conditions such as geographical conditions and quantitative conditions. Moreover, the target vehicle 10X is one of the plurality of vehicles 10. The vehicle 10 and the center server 100 communicate with each other via a network NW. The network NW includes the Internet, a WAN (Wide Area Network), a LAN (Local Area Network), a provider device, a wireless base station, and the like, for example.

[Vehicle 10]

Figure 2:
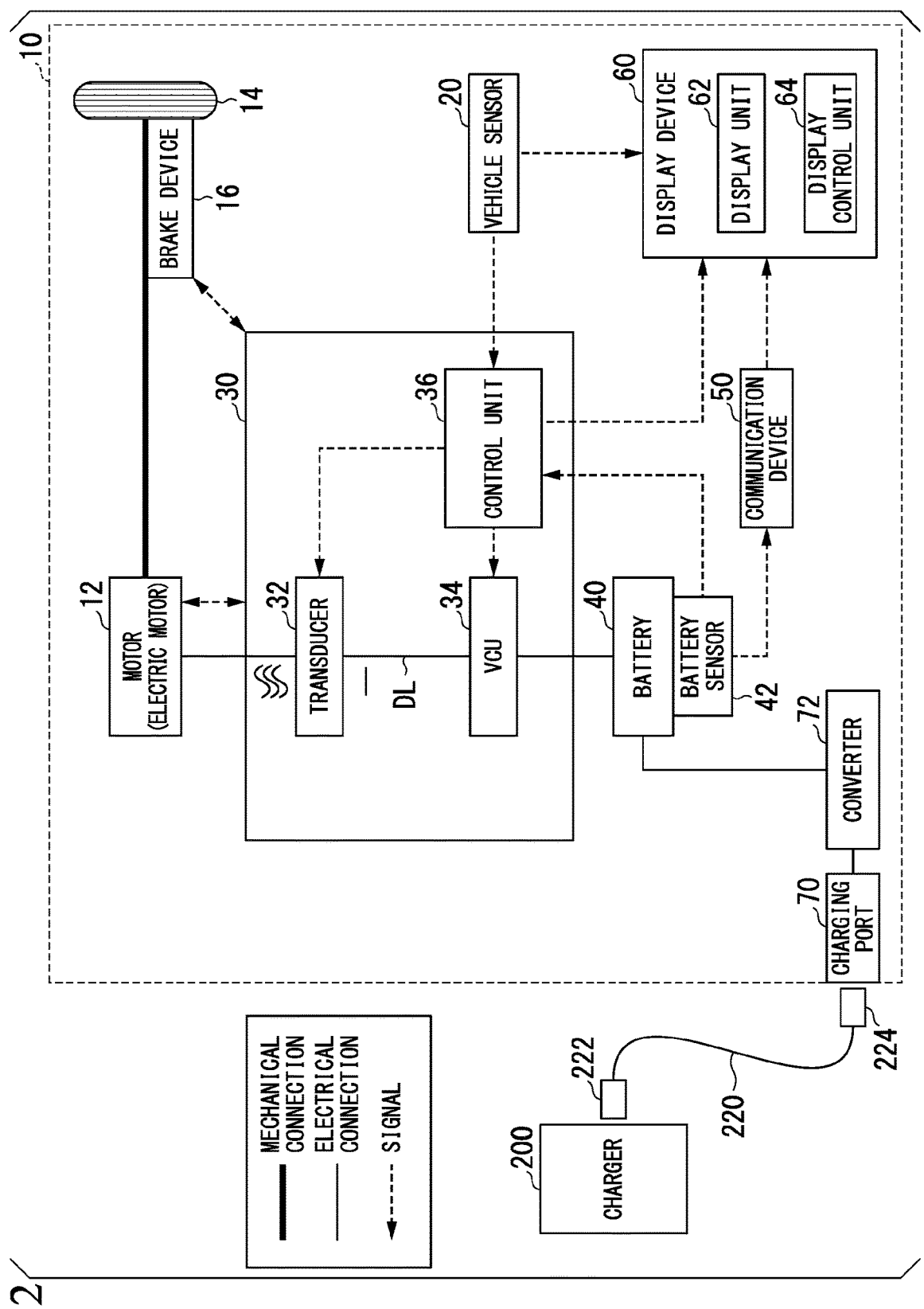
FIG. 2 is a diagram illustrating an example of a configuration of a vehicle 10.

FIG. 2 is a diagram illustrating an example of a configuration of the vehicle 10. As illustrated in FIG. 2, the vehicle 10 includes, for example, a motor 12, drive wheels 14, a brake device 16, a vehicle sensor 20, a PCU (Power Control Unit) (computer) 30, a battery 40, a battery sensor 42 including a voltage sensor, a current sensor, and a temperature sensor, a communication device (a first communication unit) 50, a display device 60, a second display device 95, a charging port 70, and a converter 72.

The motor 12 is, for example, a three-phase AC electric motor. The rotor of the motor 12 is connected to the drive wheels 14. The motor 12 outputs power to the drive wheels 14 using electric power supplied thereto. Further, the motor 12 generates electricity using the kinetic energy of the vehicle when the vehicle decelerates.

The brake device 16 includes, for example, a brake caliper, a cylinder that transmits hydraulic pressure to the brake caliper, and an electric motor that generates hydraulic pressure in the cylinder. The brake device 16 may include a mechanism for transmitting the hydraulic pressure generated by the operation of the brake pedal to the cylinder via a master cylinder as a backup. The brake device 16 is not limited to the configuration described above, and may be an electronically controlled hydraulic brake device that transmits the hydraulic pressure of the master cylinder to the cylinder.

The vehicle sensors 20 include an accelerator opening sensor, a vehicle speed sensor, and a brake pedal sensor. The accelerator opening sensor is attached to an accelerator pedal, which is an example of an operator that receives an acceleration instruction from a driver, detects the amount of operation of the accelerator pedal, and outputs the same to the control unit 36 as an accelerator opening. The vehicle speed sensors include, for example, a wheel speed sensor attached to each wheel and a speed calculator, combine the wheel speed detected by the wheel speed sensors to derive the speed (vehicle speed) of the vehicle, and output the same to the control unit 36 and the display device 60. The brake pedal sensor is attached to a brake pedal, detects the operation amount of the brake pedal, and outputs the same to the control unit 36 as a brake step amount.

The PCU 30 includes, for example, a transducer 32, a VCU (Voltage Control Unit) 34, and the control unit 36. These components being integrated as the PCU 30 are an example only, and these components may be arranged in a distributed manner.

The transducer 32 is, for example, an AC-DC transducer. A DC-side terminal of the transducer 32 is connected to a DC link DL. The battery 40 is connected to the DC link DL via the VCU 34. The transducer 32 converts the AC current generated by the motor 12 to DC current and outputs the same to the DC link DL.

The VCU 34 is, for example, a DC-DC converter. The VCU 34 boosts the electric power supplied from the battery 40 and outputs the same to the DC link DL.

The control unit 36 includes, for example, a motor control unit, a brake control unit, and a battery and VCU control unit. The motor control unit, the brake control unit, and the battery and VCU control unit may be replaced with separate control devices such as a motor ECU, a brake ECU, and a battery ECU.

The motor control unit controls the motor 12 on the basis of the output of the vehicle sensor 20. The brake control unit controls the brake device 16 on the basis of the output of the vehicle sensor 20. The battery and VCU control unit calculates the SOC (State Of Charge; hereinafter also referred to as "battery charge rate") of the battery 40 on the basis of the output of the battery sensor 42 attached to the battery 40, and outputs the same to the VCU 34 and the display device 60. The VCU 34 raises the voltage of the DC link DL in response to an instruction from the battery and VCU control unit.

The battery 40 is a secondary battery such as a lithium-ion battery, for example. The battery 40 stores electric power introduced from a charger 200 outside the vehicle 10 and discharges the electric power for traveling of the vehicle 10. The battery sensor 42 includes, for example, a current sensor, a voltage sensor, and a temperature sensor. The battery sensor 42 detects, for example, a current value, voltage value, temperature, and the like of the battery 40. The battery sensor 42 outputs the detected current value, voltage value, temperature, and the like to the control unit 36 and the communication device 50.

The communication device 50 includes a wireless module for connecting to a cellular network or a Wi-Fi network.

The communication device 50 acquires battery usage status information such as a current value, a voltage value, and a temperature output from the battery sensor 42, and transmits the battery usage status information to the center server 100 via the network NW illustrated in FIG. 1. The communication device 50 adds the battery type information and the vehicle type information of the host vehicle to the battery usage status information which is transmitted. Moreover, the communication device 50 receives the information transmitted from the center server 100 via the network NW. The communication device 50 outputs the received information to the display device 60.

The display device 60 includes, for example, a display unit 62 and a display control unit 64. The display unit 62 displays information according to the control of the display control unit 64. The display control unit 64 causes the display unit 62 to display the deviation value of the battery deterioration degree according to the information output from the control unit 36 and the communication device 50. Further, the display control unit 64 causes the display unit 62 to display the vehicle speed and the like output from the vehicle sensor 20.

The charging port 70 is provided to face outside from the vehicle body of the vehicle 10. The charging port 70 is connected to the charger 200 via a charging cable 220. The charging cable 220 includes a first plug 222 and a second plug 224. The first plug 222 is connected to the charger 200, and the second plug 224 is connected to the charging port 70.

The electricity supplied from the charger 200 is supplied to the charging port 70 via the charging cable 220.

The charging cable 220 includes a signal cable attached to the power cable. The signal cable relays communication between the vehicle 10 and the charger 200. Therefore, each of the first plug 222 and the second plug 224 is provided with a power connector and a signal connector.

The converter 72 is provided between the battery 40 and the charging port 70. The converter 72 converts a current (for example, an AC current) introduced from the charger 200 via the charging port 70 to a DC current. The converter 72 outputs the converted DC current to the battery 40.

Figure 3:
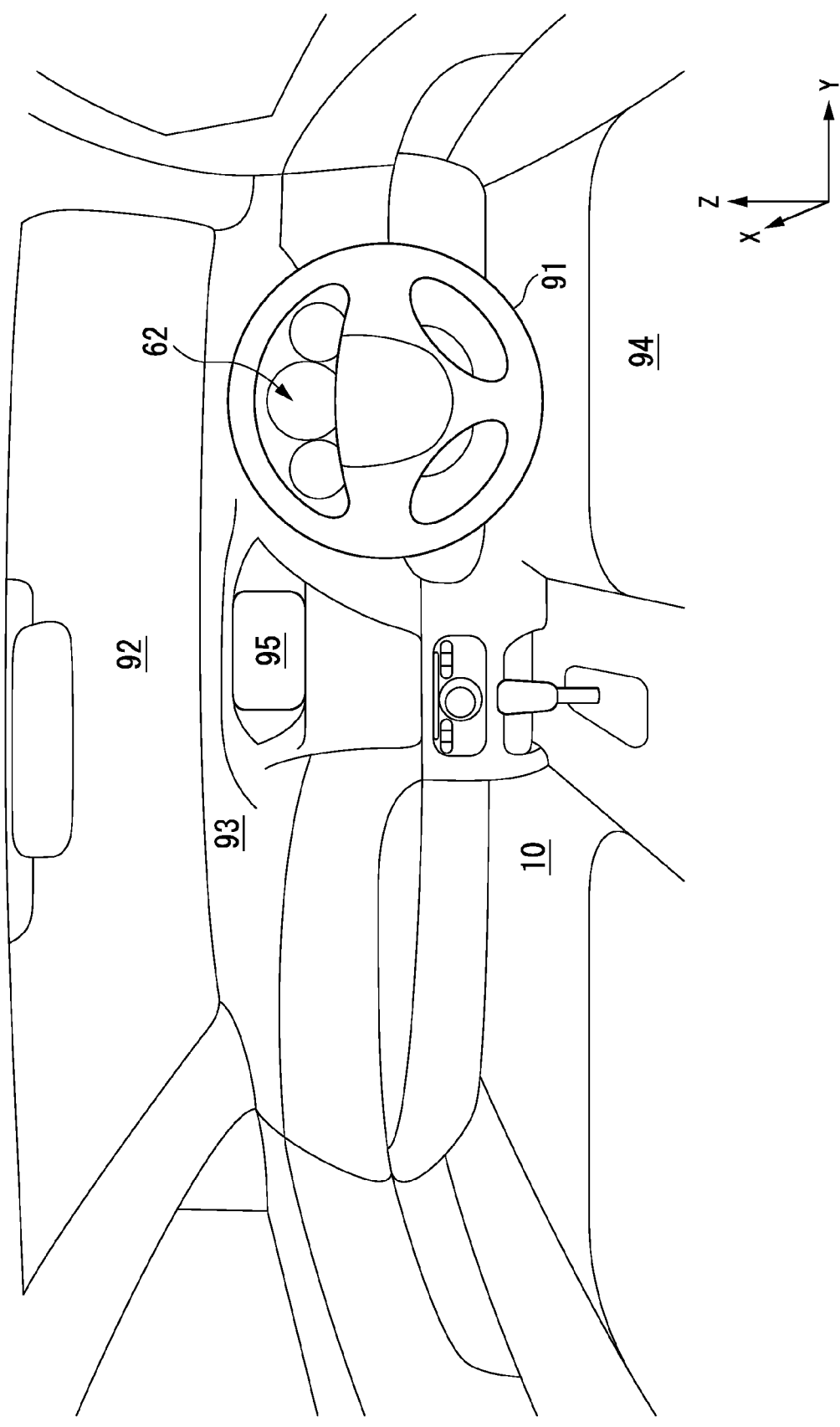
FIG. 3 is a diagram illustrating a configuration of the interior of the vehicle 10.

FIG. 3 is a diagram illustrating the configuration of the interior of the vehicle 10. As illustrated in FIG. 2, the vehicle 10 is provided with, for example, a steering wheel 91 for controlling the steering of the vehicle 10, a front windshield 92 for separating the outside and the inside of the vehicle, and an instrument panel 93. The front windshield 92 is a light transmitting member.

The display unit 62 of the display device 60 is provided near the front of a driver's seat 94 on the instrument panel 93 in the vehicle interior. The display unit 62 is visible to the driver through a gap by the steering wheel 91 or through the steering wheel 91. The second display device 95 is provided in the center of the instrument panel 93. The second display device 95 displays, for example, an image corresponding to a navigation process executed by a navigation device (not illustrated) mounted in the vehicle 10 and displays the picture of a counterpart in a videophone. In addition, the second display device 95 may display a television program, play a DVD, and display content such as a downloaded movie.

[Center Server 100]

The center server 100 illustrated in FIG. 1 includes, for example, a receiving unit (an example of an acquisition unit or a second communication unit) 110, a model generation unit (a processing unit or a computer) 120, and a deriving unit (a processing unit or a computer) 130, a transmitting unit (an example of a presentation unit or a second communication unit) 140, and a storage unit 150. The model generation unit 120 and the deriving unit 130 are realized by, for example, a hardware processor such as a CPU (Central Processing Unit) executing a program (software). Some or all of these components may be realized by hardware (including circuitry) such as a LSI (Large Scale Integration), an ASIC (Application Specific Integrated Circuit), an FPGA (Field-Programmable Gate Array), and a GPU (Graphics Processing Unit) and may be realized by the cooperation of software and hardware. The program may be stored in advance in a storage device (a storage device having a non-transitory storage medium) such as an HDD (Hard Disk Drive) or a flash memory, or may be stored in a removable storage medium (a non-transitory storage medium) such as a DVD or a CD-ROM and be installed when the storage medium is mounted on a drive device. The storage unit 150 is realized by the storage device described above.

The receiving unit 110 receives information indicating the battery state such as the current value, the voltage value, the SOC (State Of Charge), the temperature, the lifetime mileage, and the lifetime elapsed time of the batteries transmitted from the plurality of vehicles 10. The receiving unit 110 stores the received information in the storage unit 150 as collected data 152 for each piece of identification information of the vehicle 10 (for example, license plate information, communication identification information of the communication device 50, or identification information of a registered user). Battery type information and vehicle type information may be added to the collected data 152.

As a premise for the processing (statistical processing) of the center server 100, the plurality of vehicles 10 each detects the current value, voltage value, and temperature of the battery 40 with the aid of the battery sensor 42, and transmit the same from the communication device 50 to the center server 100 as battery usage status information.

The vehicle 10 may transmit the battery usage status information at predetermined time intervals, for example, every hour or every day, or may transmit the same on the basis of an instruction of the user of the vehicle 10. Further, the vehicle 10 may transmit the battery usage status information in response to the request of the center server 100.

The vehicle 10 may transmit the battery usage status information when a predetermined condition is satisfied, for example, when the battery load exceeds a certain amount, or when an amount of increase in battery load from the previous transmission reaches a certain amount. Further, the vehicle 10 may transmit the battery usage status information at any one or more of these timings.

The model generation unit 120 calculates and acquires the battery capacity on the basis of the current value, voltage value, SOC, and temperature of the battery received by the receiving unit 110 and stored in the storage unit 150 as the collected data 152 and stores the battery capacity in the storage unit 150 as acquired data 154. Similarly to the collected data 152, battery type information and vehicle type information may be added to the acquired data 154.

The model generation unit 120 performs machine learning using the data stored in the storage unit 150 as learning data and teacher data and generates a capacity estimation model 156. The model generation unit 120 uses the battery current value, voltage value, SOC, temperature, lifetime mileage, and lifetime elapsed time stored in the storage unit 150 as the collected data 152 as learning data. The model generation unit 120 uses the battery capacity (the battery deterioration degree) stored in the storage unit 150 as the acquired data 154 as the teacher data. Since the battery capacity decreases as the battery deteriorates, the battery capacity is an index indicating the battery deterioration degree.

For example, the model generation unit 120 may generate a neural network model for all batteries on the market as a capacity estimation model 156 in which data (current value I, voltage value V, SOC, temperature T, lifetime mileage, and lifetime elapsed time) related to batteries of the same type (a plurality of secondary batteries satisfying predetermined conditions) are input and a battery capacity (cell capacity) is output. The model generation unit 120 stores the generated capacity estimation model 156 in the storage unit 150. The model generation unit 120 integrates the output of the capacity estimation model 156 when generating the capacity estimation model 156.

The deriving unit 130 generates a battery capacity distribution of the batteries mounted in the plurality of vehicles 10 in the market using the integrated value of the capacity estimation model 156 integrated by the model generation unit 120.

The deriving unit 130 stores the generated battery capacity distribution in the storage unit 150. Further, the deriving unit 130 reads the battery capacity distribution and the battery capacity (hereinafter referred to as a "target battery capacity") estimated on the basis of the collected data 152 transmitted from the target vehicle 10X from the storage unit 150. The deriving unit 130 derives a deviation value (a relative deterioration degree) of the deterioration degree of the battery mounted in the target vehicle 10X among the batteries mounted in the plurality of vehicles 10 in the market on the basis of the read target battery capacity and battery capacity distribution. The deriving unit 130 outputs the derived deviation value to the transmitting unit 140.

The transmitting unit 140 transmits the deviation value output from the deriving unit 130 to the target vehicle 10X and presents the same to the user of the target vehicle 10X via the target vehicle 10X.

Figure 4:
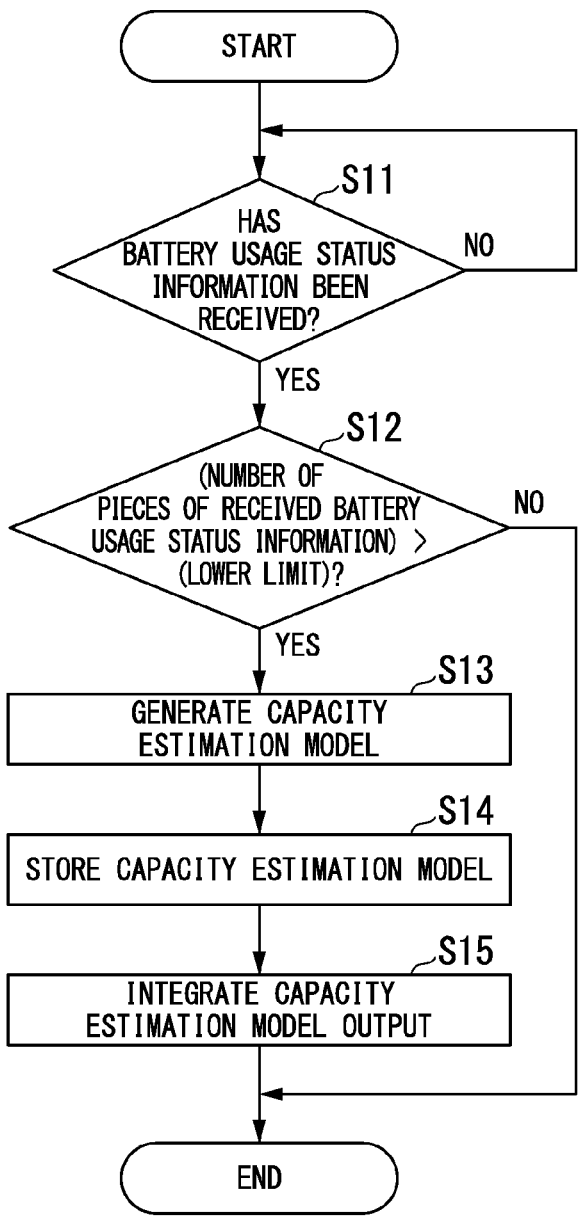
FIG. 4 is a flowchart illustrating an example of the flow of processing executed by each unit of a center server 100 according to a first embodiment of the present invention.
Figure 5:
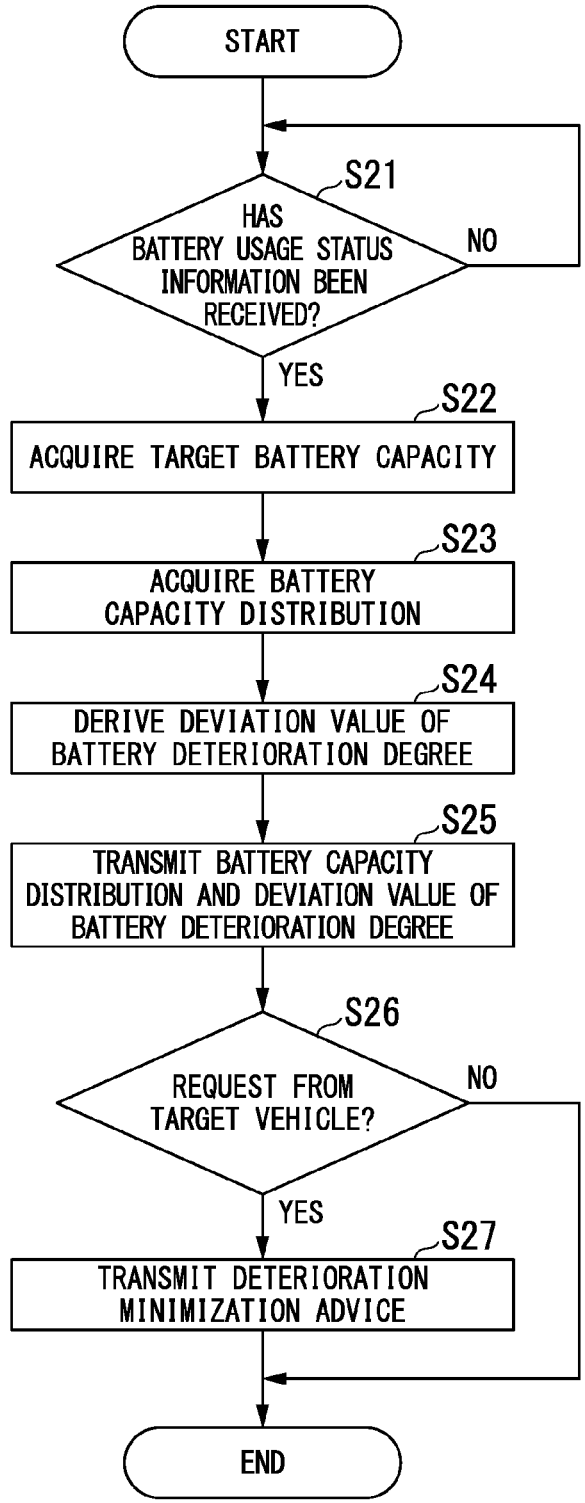
FIG. 5 is a flowchart illustrating an example of the flow of processing executed by each unit of the center server 100 according to the first embodiment of the present invention.

Next, the processing in the center server 100 will be described in more detail. FIGS. 4 and 5 are flowcharts illustrating an example of the flow of processing executed by each unit of the center server 100. In the center server 100, the processing for generating the capacity estimation model 156 will be described with reference to FIG. 4, and the processing for deriving the deviation value of the battery deterioration degree and transmitting a deterioration minimization advice will be described to with reference to FIG. 5.

As illustrated in FIG. 4, when generating the capacity estimation model 156, first, the center server 100 determines whether the receiving unit 110 has received the battery usage status information transmitted from the plurality of vehicles 10 (step S11). When it is determined that the receiving unit 110 has not received the battery usage status information (step S11: NO), the center server 100 repeats the process of step S11.

When it is determined that the receiving unit 110 has received the battery usage status information (step S11: YES), the center server 100 determines whether the number of pieces of received battery usage status information exceeds a lower limit (step S12). The lower limit of the number of pieces of received battery usage status information is the number of pieces of data required for generating the capacity estimation model 156, and an appropriate number can be set. The center server 100 can generate a more accurate capacity estimation model 156 as the number of pieces of received battery usage status information increases. Therefore, the center server 100 may set the number of pieces of data that can generate the capacity estimation model 156 with a predetermined accuracy as the lower limit of the number of pieces of received battery usage status information. Further, once the number of pieces of received battery usage status information exceeds the lower limit, the determination in step S12 may be omitted.

When it is determined that the number of pieces of received battery usage status information has not exceeded the lower limit (step S12: NO), the center server 100 ends the process illustrated in FIG. 4 as it is. When it is determined that the number of pieces of received battery usage status information has exceeded the lower limit (step S12: YES), the model generation unit 120 of the center server 100 generates the capacity estimation model 156 (step S13). The model generation unit 120 generates the capacity estimation model 156 as follows, for example.

Figure 6:
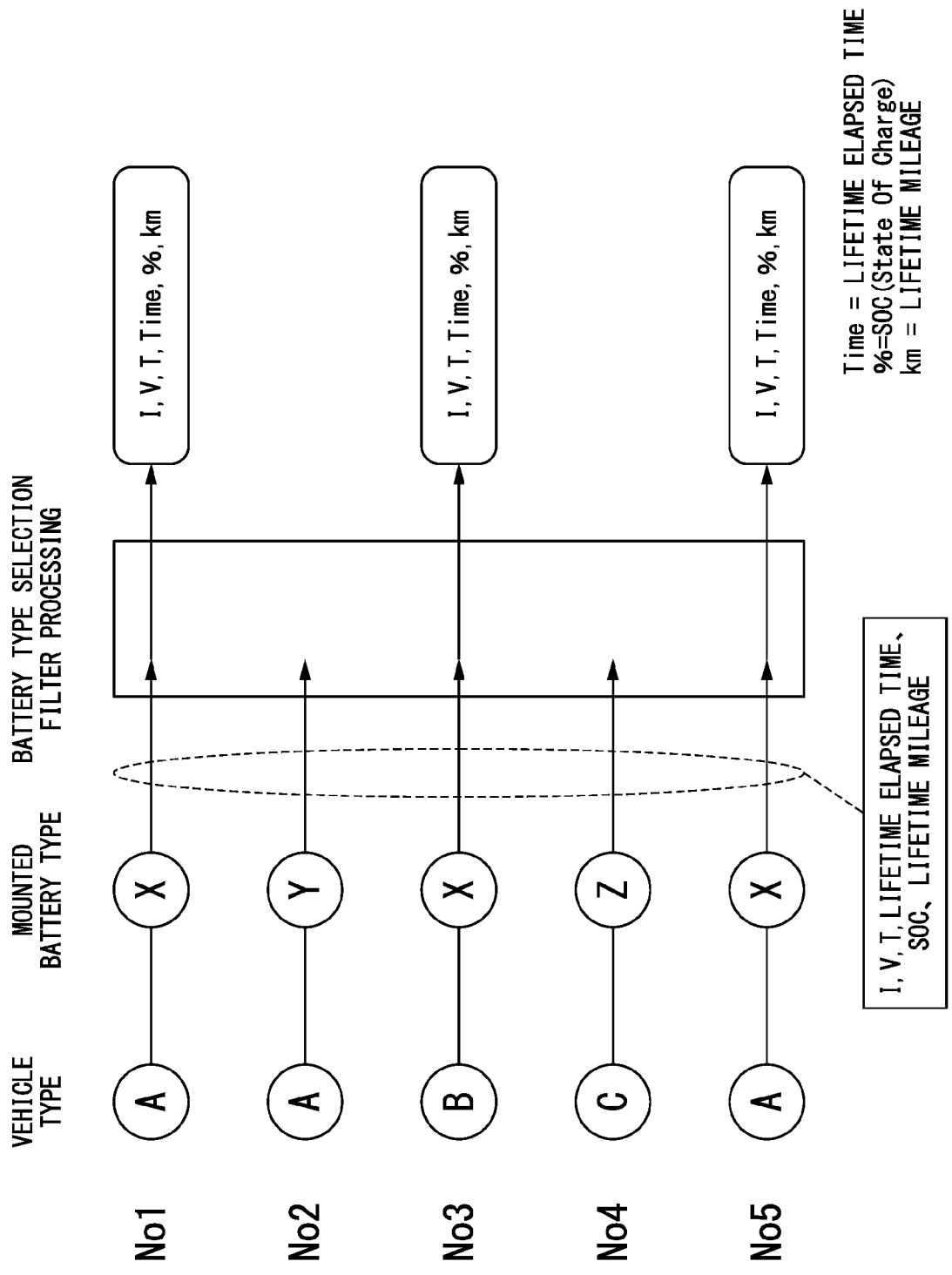
FIG. 6 is a conceptual diagram of a process of generating a capacity estimation model 156.

FIG. 6 is a conceptual diagram of the generation process of the capacity estimation model 156. As illustrated in FIG. 6, the model generation unit 120 applies the battery usage status information (current value (I), voltage value (V), SOC (%), temperature (T)) included in the collected data 152, and data of the lifetime mileage (km) and lifetime elapsed time (Time) to a battery type selection filter. In the example illustrated in FIG. 6, data is provided from vehicles No. 1 to No5.

The model generation unit 120 selects the collected data 152 on the basis of the battery type information and the vehicle type information added to the collected data 152. The model generation unit 120 may select the collected data 152 on the basis of the battery type information, or may select the collected data 152 on the basis of the battery type information and the vehicle type information. The model generation unit 120 selects the battery usage status information and the lifetime elapsed time of batteries of the same type (or batteries of the same type and mounted in the same vehicle type) using a battery type selection filter. In the example illustrated in FIG. 6, the battery usage status and lifetime elapsed time for the "X" type battery are selected. Therefore, although the five battery usage statuses and the elapsed life time of No. 1 to No5 are illustrated in FIG. 6, the model generation unit 120 selects the three pieces of data of No1, No3, and No5 as the information on the "X" type battery.

Figure 7:
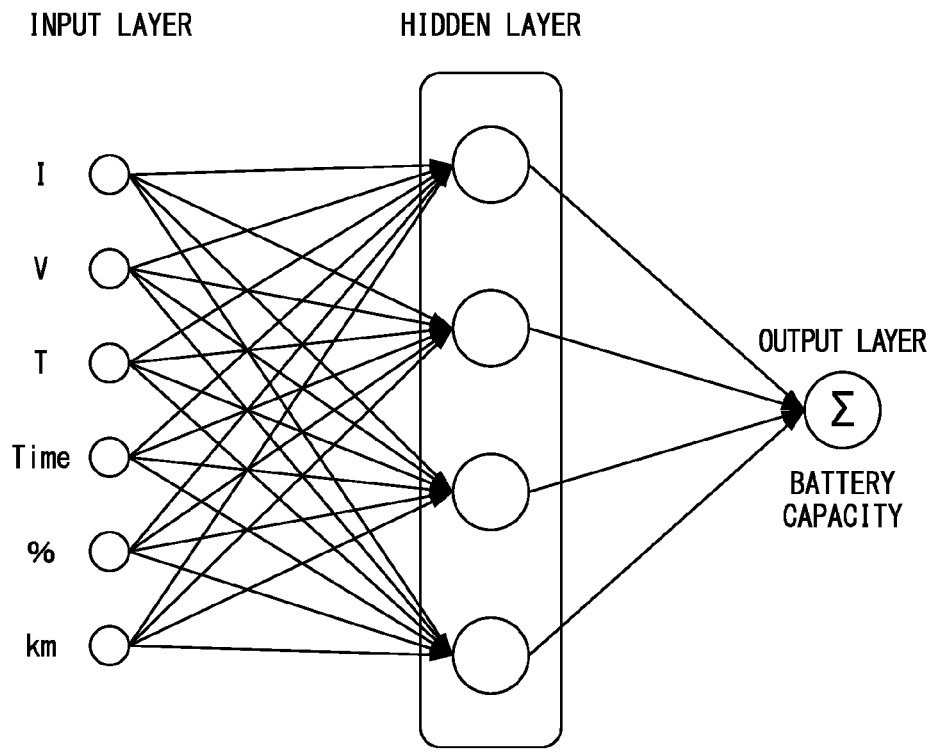
FIG. 7 is a conceptual diagram of a generation process of the capacity estimation model 156 continued from FIG. 6.

FIG. 7 is a conceptual diagram of the generation process of the capacity estimation model 156 continued from FIG. 6. As illustrated in FIG. 7, the model generation unit 120 generates the capacity estimation model 156 having an input layer, a hidden layer, and an output layer. The input layer receives the current value (I), voltage value (V), SOC (%), and temperature (T), which are the items of the battery usage status information, and the lifetime mileage (km) and the lifetime elapsed time (Time). The output layer outputs a battery capacity. The hidden layer has a multi-layer neural network that connects the input layer and the output layer. The parameters of the hidden layer are optimized by performing machine learning using the input to the input layer as learning data and the data to be output from the output layer as teacher data.

The model generation unit 120 generates (updates) the capacity estimation model 156 by performing machine learning in which the battery usage status information and the lifetime elapsed time selected in FIG. 6 are input to the input layer. In this way, the model generation unit 120 generates the capacity estimation model 156 for each type of battery, for example, the "X" type battery, and stores the same in the storage unit 150.

Returning to the flow illustrated in FIG. 4, the model generation unit 120 of the center server 100 generates the capacity estimation model 156. After that, the model generation unit 120 stores the generated capacity estimation model 156 in the storage unit 150 (step S14). Further, the center server 100 integrates the output when the capacity estimation model 156 is generated and stores the same in the storage unit 150 (step S15). In this way, the center server 100 ends the process illustrated in FIG. 4.

Next, a process for deriving the deviation value of the battery deterioration degree and transmitting the deterioration minimization advice will be described with reference to FIG. 5. As illustrated in FIG. 5, when deriving the deviation value of the battery deterioration degree, first, the center server 100 determines whether the receiving unit 110 has received the battery usage status information transmitted from the plurality of vehicles 10 (step S21). When it is determined that the receiving unit 110 has not received the battery usage status information (step S21: NO), the center server 100 repeats the process of step S21.

When it is determined that the receiving unit 110 has received the battery usage status information (step S21: YES), the center server 100 acquires the target battery capacity (step S22). The deriving unit 130 of the center server 100 reads and acquires the target battery capacity estimated on the basis of the battery usage status information transmitted from the target vehicle 10X and stored in the storage unit 150 as collected data from the storage unit 150.

Subsequently, the deriving unit 130 of the center server 100 reads and acquires the battery capacity distribution stored in the storage unit 150 (step S23). The deriving unit 130 calculates a deviation value of the battery deterioration degree on the basis of the target battery capacity acquired in step S22 and the battery capacity distribution acquired in step S23 (step S24).

Figure 8:
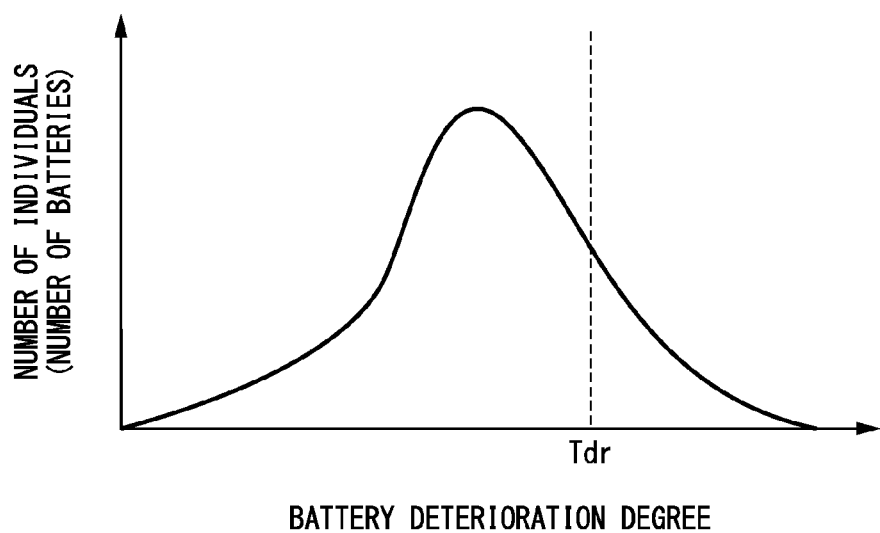
FIG. 8 is a histogram illustrating an example of the distribution of a battery deterioration degree of batteries mounted in the vehicles 10 on the market.

FIG. 8 is a histogram illustrating an example of the distribution of the battery deterioration degree of the battery mounted in the vehicle 10 in the market. The battery capacity distribution obtained in step S22 is represented, for example, by the histogram illustrated in FIG. 8, and the number of batteries mounted in the vehicles 10 in which a predetermined number of batteries have deteriorated is represented as the number of individuals (number of batteries).

On the other hand, the battery deterioration degree Tdr of the target vehicle 10X is indicated by a broken line in FIG. 8. The deriving unit 130 obtains the average value, the variance, and the standard deviation of the battery deterioration degree from the distribution of the battery deterioration degree illustrated in FIG. 8. Using these average values, variances, and standard deviations and the battery deterioration degree of the target vehicle 10X, the deviation value of the degree of change in the batteries mounted in the target vehicle 10X is calculated.

For example, when the battery deterioration degree Tdr of the target vehicle 10X is not more than a predetermined value, it can be determined that the battery deterioration degree of the target vehicle 10X is standard in the market. On the other hand, when the battery deterioration degree Tdr of the target vehicle 10X exceeds a predetermined value (the battery deterioration degree is worse than the standard), since the battery deterioration degree of the target vehicle 10X is larger than that in the market, it can be determined that some measures are required. As described above, from the graph of FIG. 8, the relative position of the battery capacity of the target vehicle 10X with respect to the battery capacity of the vehicle 10 in the market can be observed objectively.

Figure 9:
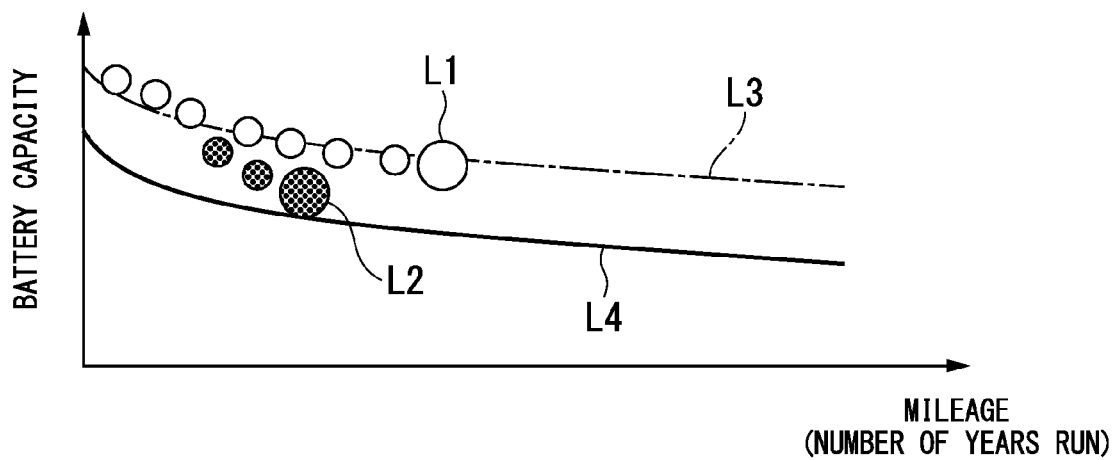
FIG. 9 is a graph illustrating a comparison between a battery capacity of the vehicle 10 in the market and a battery capacity of a target vehicle 10X in correspondence with the mileage (or the number of years run).

FIG. 9 is a graph illustrating a comparison between the capacity of a battery mounted in the vehicle 10 in the market (hereinafter referred to as the battery capacity of the vehicle 10) and the capacity of a battery 40 mounted in the target vehicle 10X (hereinafter referred to as the battery capacity of the target vehicle 10X) in correspondence with the mileage (or the number of years run).

In FIG. 9, broken lines L1 and L2 described by continuous circle marks indicate change in the battery capacity (fully charged capacity) of the target vehicle 10X with respect to the mileage (or the number of years run). In the following description, the broken lines L1 and L2 are also referred to as a battery capacity change L1 and a battery capacity change L2.

A broken line L3 indicates the standard value of the change in the battery capacity of the target vehicle 10X.

A solid line L4 indicates the lower limit of the change in the battery capacity of the target vehicle 10X.

The change in battery capacity L1 indicates that the change in battery capacity of the target vehicle 10X follows the standard value L3.

The battery capacity change L2 indicates that the change in the battery capacity of the target vehicle 10X deviates from the standard value L3 or approaches the lower limit L4.

In FIG. 9, in order to explain the difference between the battery capacity change L1 and the battery capacity change L2, the battery capacity change L1 and the battery capacity change L2 are illustrated together, but the actual change in the battery capacity of the target vehicle 10X is indicated by one broken line.

For example, when the change in the battery capacity of the target vehicle 10X describes a broken line L1, it can be determined that the battery deterioration degree of the target vehicle 10X is standard in the market. On the other hand, when the change in the battery capacity of the target vehicle 10X draws a broken line L2, it can be determined that some measures are required since the battery deterioration degree of the target vehicle 10X is larger than that in the market. As described above, from the graph of FIG. 9, the relative position of the battery capacity of the target vehicle 10X with respect to the battery capacity of the vehicle 10 in the market can be observed objectively.

The standard value L3 of the battery capacity of the target vehicle 10X is set on the basis of the result of statistically analyzing the battery usage status information of the vehicle 10 transmitted to the center server 100 for the vehicle 10 equipped with a battery equivalent to the battery 40, for example, the average value of the battery deterioration degree obtained from the distribution of the battery deterioration degree illustrated in FIG. 8.

The lower limit L4 of the battery capacity of the target vehicle 10X is set on the basis of the result of statistically analyzing the battery usage status information of the vehicles 10 transmitted to the center server 100 for the vehicles 10 equipped with a battery equivalent to the battery 40, for example, the average value or the like of the battery deterioration degree of which the deviation value exceeds a predetermined value (the battery deterioration degree is the highest) within the distribution of the battery deterioration degree illustrated in FIG. 8.

The standard value L3 and the lower limit L4 of the battery capacity of the target vehicle 10X are reanalyzed and updated as the battery usage status information of the vehicle 10 is accumulated in the center server 100.

The standard value L3 of the battery capacity of the target vehicle 10X may be a value experimentally calculated by the manufacturer of the target vehicle 10X or the battery 40 assuming that a standard vehicle (battery) is used.

The lower limit L4 of the battery capacity of the target vehicle 10X may be a value experimentally calculated by the manufacturer of the target vehicle 10X or the battery 40 assuming that a vehicle (battery) that has been the most abused (of which the battery deterioration degree is the largest) is used.

The standard value L3 of the battery capacity of the target vehicle 10X may be a value calculated by the manufacturer of the target vehicle 10X or the battery 40 substituting the usage status information of the battery 40 of the target vehicle 10X into a battery capacity deterioration model function prepared in advance.

The lower limit L4 of the battery capacity of the target vehicle 10X may be a value calculated by the manufacturer of the target vehicle 10X or the battery 40 substituting the usage status information based on the most abused use of the battery 40 of the target vehicle 10X into a battery capacity deterioration model function prepared in advance.

When these model functions are used, the standard value L3 and the lower limit L4 of the battery capacity of the target vehicle 10X in the future from the present time may be values calculated by substituting the future usage status information estimated on the basis of the history of the past usage status information into these model functions.

When the deviation value of the deterioration degree of the battery mounted in the target vehicle 10X is calculated, the transmitting unit 140 of the center server 100 transmits the battery capacity distribution and the deviation value of the battery deterioration degree to the target vehicle 10X (step S25). In this way, the center server 100 presents the battery capacity distribution and the deviation value of the battery deterioration degree with the aid of the transmitting unit 140.

The target vehicle 10X receives the battery capacity distribution and the deviation value of the battery deterioration degree transmitted from the center server 100 with the aid of the communication device 50 illustrated in FIG. 1. The communication device 50 outputs the received battery capacity distribution and the deviation value of the battery deterioration degree to the display device 60.

The display control unit 64 of the display device 60 causes, for example, the display unit 62 to display the battery capacity distribution and the deviation value of the battery deterioration degree. The battery capacity distribution may be displayed in the form of the histogram illustrated in FIG. 8 as it is, for example, or may be displayed in another form. Further, the deviation value of the battery deterioration degree may be displayed as a value or may be displayed as a histogram or the like illustrated in FIG. 8. Further, the battery deterioration degree may be displayed in the form of the graph illustrated in FIG. 9 as it is, for example, or may be displayed in another form. In this way, the presentation system 1 presents the battery capacity distribution of the battery mounted in the target vehicle 10 in the market and the deviation value of the deterioration degree of the battery mounted in the target vehicle 10X to the user of the target vehicle 10X.

The center server 100 determines whether there is a request for transmission of deterioration minimization advice from the target vehicle 10X (step S26).

If there is no request (step S26: No), the center server 100 ends the process illustrated in FIG. 5. On the other hand, when there is a request (step S26: Yes), the center server 100 transmits deterioration minimization advice corresponding to the deviation value of the deterioration degree of the battery mounted in the target vehicle 10X to the target vehicle 10X (step S27), and ends the process illustrated in FIG. 5.

Whether it is necessary to present the deterioration minimization advice to the target vehicle 10X is determined by, for example, the display control unit 64 or the user of the target vehicle 10X.

For example, when the display control unit 64 determines that the battery deterioration degree Tdr of the target vehicle 10X exceeds a predetermined value, the communication device 50 requests the center server 100 to transmit the deterioration minimization advice.

For example, when the battery capacity of the target vehicle 10X changes as indicated by the broken line L2 in FIG. 9, and the user determines that the battery deterioration degree of the target vehicle 10X is larger than that in the market and some measures are required, the user requests the center server 100 to transmit the deterioration minimization advice via the communication device 50 by operating the input unit (not illustrated).

The target vehicle 10X receives the deterioration minimization advice transmitted from the center server 100 with the aid of the communication device 50 illustrated in FIG. 1. The communication device 50 outputs the received deterioration minimization advice to the display device 60. The display control unit 64 of the display device 60 causes, for example, the display unit 62 to display the deterioration minimization advice. In this way, the presentation system 1 presents the deterioration minimization advice on the battery mounted in the target vehicle 10X to the user of the target vehicle 10X.

The content of the deterioration minimization advice (information for minimizing the deterioration of the battery) includes, for example, a proposal to reduce the frequency of fully charging the battery for a user who has a short traveling time per run.

When the battery capacity of the target vehicle 10X has deviated extremely from the standard value L3 on the side below thereof, or the battery capacity of the target vehicle 10X is extremely close to the lower limit L4, for example, the content of the deterioration minimization advice may point out that there may have been an initial defect or a failure of the battery 40 and recommend bringing it to a dealer.

Modified Example

Figure 10:
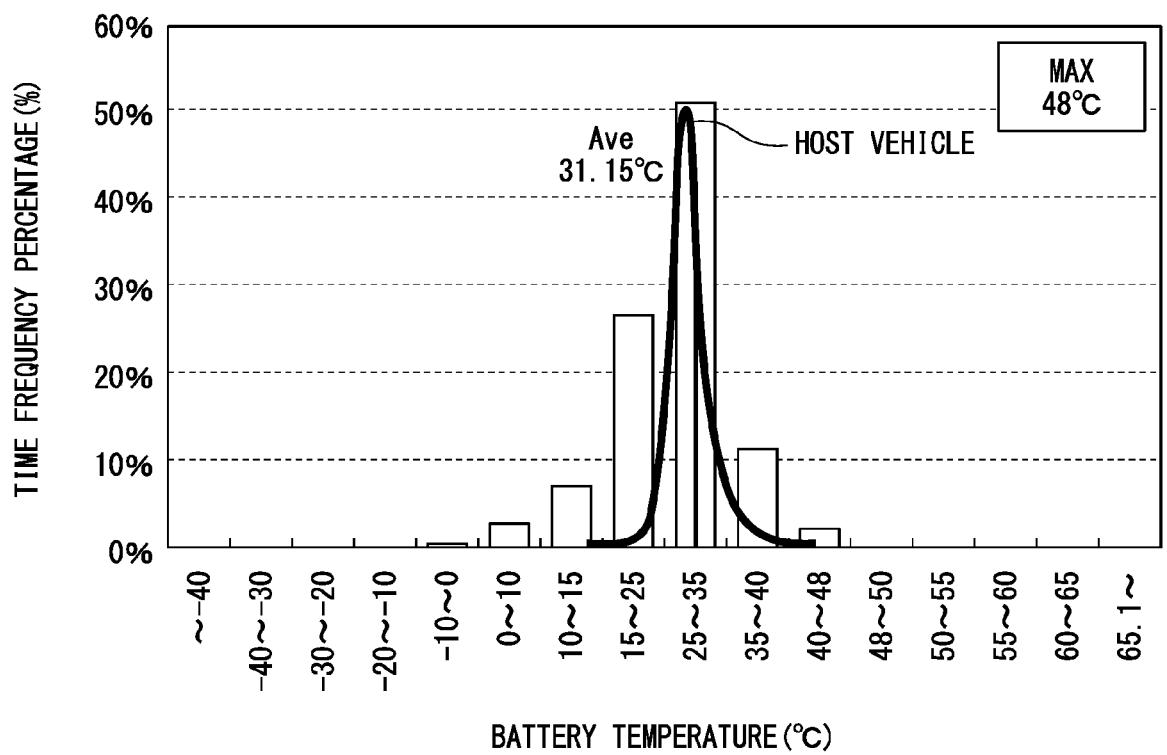
FIG. 10 is a histogram illustrating an example of comparison between a battery temperature of the vehicle 10 in the market 10 and a battery temperature of the target vehicle 10X.
Figure 11:
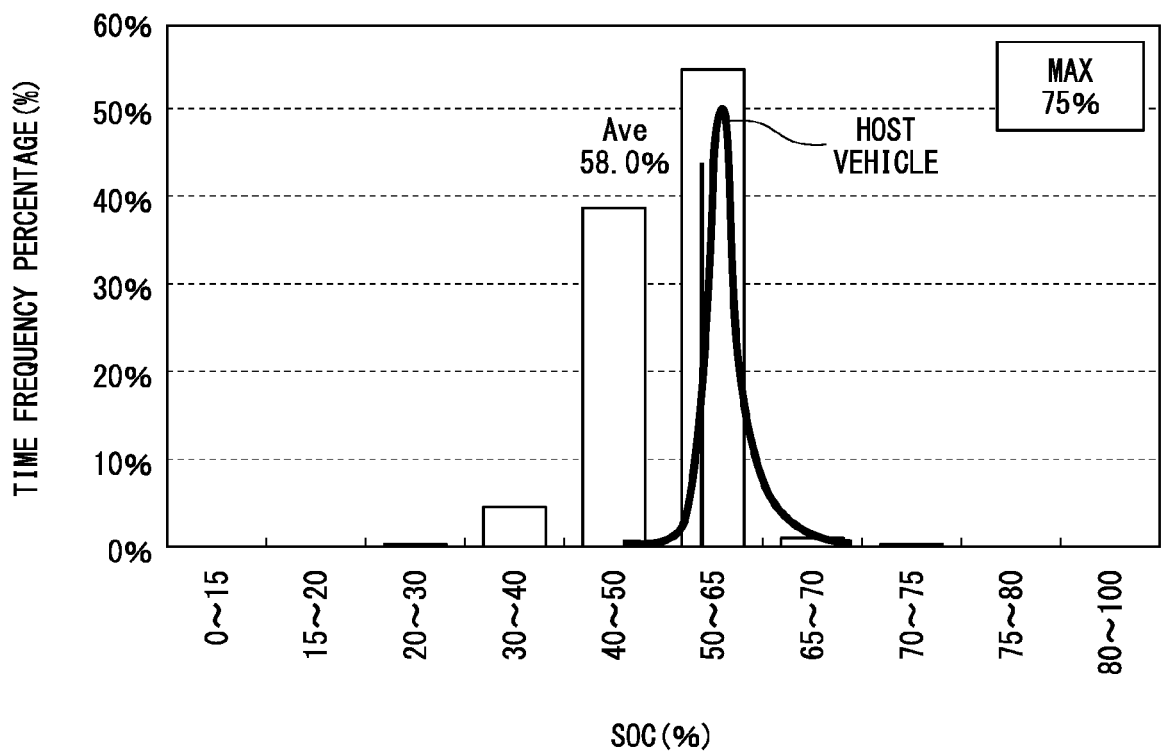
FIG. 11 is a histogram illustrating an example of comparison between a battery SOC of the vehicle 10 in the market and a battery SOC of the target vehicle 10X.
Figure 12:
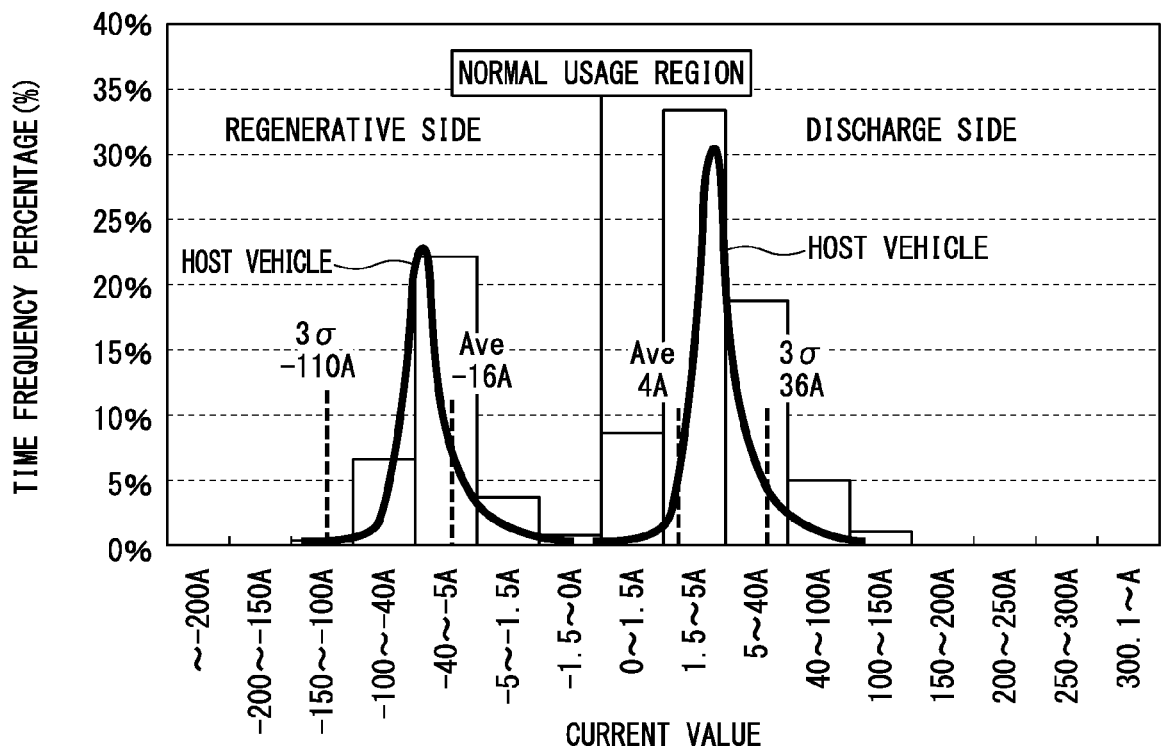
FIG. 12 is a histogram illustrating an example of comparison between a battery current value of the vehicle 10 in the market and a battery current value of the target vehicle 10X.

In addition to the battery capacity distribution, the deriving unit 130 may generate, for example, the distributions of the battery current value, SOC, and temperature illustrated in FIGS. 10 to 12 and output the distribution to the transmitting unit 140. The transmitting unit 140 may transmit the distributions illustrated in FIGS. 10 to 12 output from the deriving unit 130 to the target vehicle 10X.

FIG. 10 is a histogram illustrating an example of the comparison between the battery temperature of the vehicle 10 in the market and the battery temperature of the target vehicle 10X. The solid line in the histogram of FIG. 10 illustrates the temperature distribution of the battery 40 of the target vehicle 10X. The columnar histogram of FIG. 10 illustrates the temperature distribution of the battery of the vehicle 10. FIG. 10 illustrates that the average temperature of the batteries of the vehicle 10 is 31.15° C. and the maximum value is 48° C.

FIG. 11 is a histogram illustrating an example of the comparison between the battery SOC of the vehicle 10 in the market and the battery SOC of the target vehicle 10X. The solid line in the histogram of FIG. 11 illustrates the SOC distribution of the battery 40 of the target vehicle 10X. The columnar histogram of FIG. 11 illustrates the SOC distribution of the battery of the vehicle 10. FIG. 11 illustrates that the average SOC of the battery of the vehicle 10 is 58.0% and the maximum value is 75%.

FIG. 12 is a histogram illustrating an example of the comparison between the current value of the battery of the vehicle 10 in the market and the current value of the battery of the target vehicle 10X. The solid line in the histogram of FIG. 12 illustrates the current distribution of the battery 40 of the target vehicle 10X. The columnar histogram of FIG. 12 illustrates the distribution of the current of the battery of the vehicle 10. FIG. 12 illustrates that the average of the battery current of the vehicle 10 on the regenerative side is −16 A, the average on the discharge side is 4 A, the 3σ on the regenerative side is −110 A, and the 3σ on the discharge side is 36 A.

According to FIGS. 10 to 12, the user can ascertain the tendency of the temperature, SOC, and current distributions of the battery 40 of the target vehicle 10X as compared with the vehicle 10 in the market. According to FIGS. 10 to 12, the server can generate advice for appropriately maintaining the battery capacity on the basis of the distributions of the temperature, SOC, and current of the battery 40 of the target vehicle 10X and transmit the same to the user.

Second Embodiment

In the first embodiment, the battery capacity distribution, the deviation value of the battery deterioration degree, and the deterioration minimization advice are transmitted to the target vehicle 10X when there is a transmission request from the target vehicle 10X.

In contrast, in the second embodiment, the battery capacity distribution, the deviation value of the battery deterioration degree, and the deterioration minimization advice are transmitted to the target vehicle 10X on the basis of the determination of the deviation value of the battery deterioration degree by the center server 100.

Hereinafter, the second embodiment will be described with reference to FIG. 13.

Figure 13:
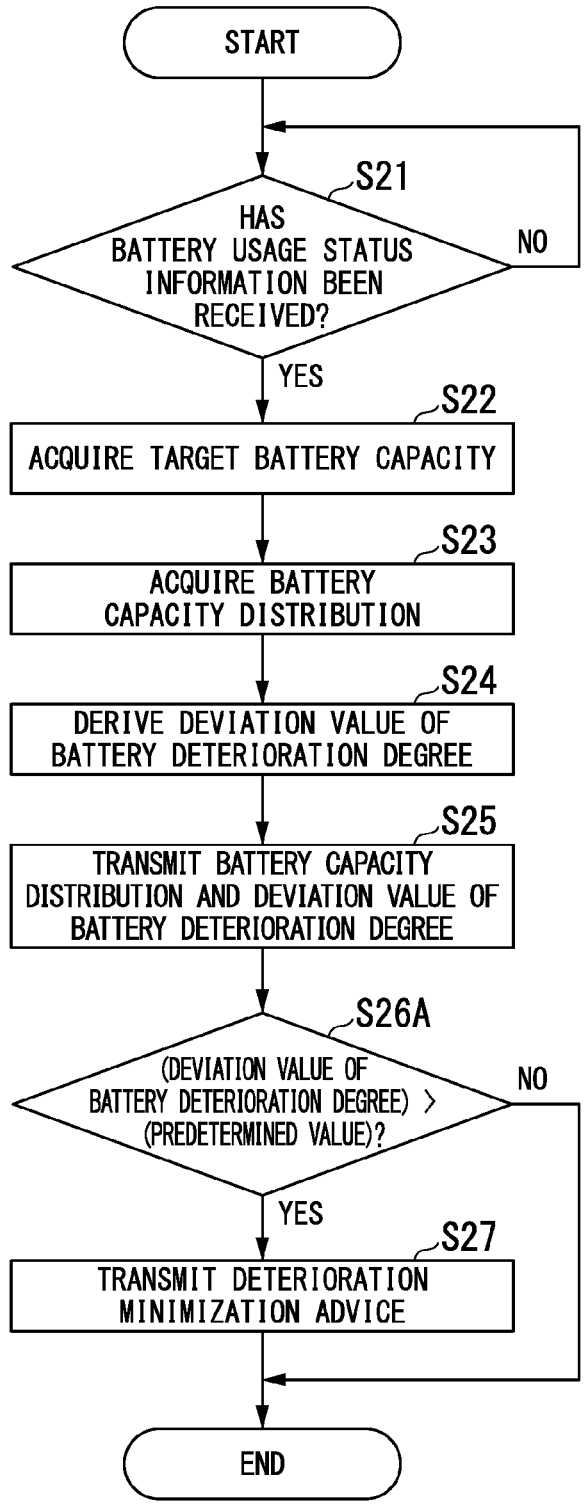
FIG. 13 is a flowchart illustrating an example of the flow of processing executed by each unit of a center server 100 according to a second embodiment of the present invention.

FIG. 13 is a flowchart illustrating an example of the flow of processing executed by each unit of the center server 100 according to the second embodiment of the present invention.

Since the difference between FIG. 5 and FIG. 13 is only step S26A, description of other steps will be omitted.

The center server 100 determines whether the deviation value of the deterioration degree of the battery mounted in the target vehicle 10X exceeds a predetermined value (step S26A).

When the deviation value does not exceed the predetermined value (step S26A: No), the center server 100 ends the process illustrated in FIG. 13. On the other hand, when the deviation value exceeds the predetermined value (step S26A: Yes), the center server 100 transmits deterioration minimization advice according to the deviation value of the battery deterioration degree to the target vehicle 10X (step S27), and ends the process illustrated in FIG. 13.

For example, when the battery deterioration degree Tdr of the target vehicle 10X exceeds the predetermined value, the center server 100 transmits the deterioration minimization advice to the target vehicle 10X.

For example, the center server 100 transmits the deterioration minimization advice to the target vehicle 10X when the battery capacity of the target vehicle 10X changes as indicated by the broken line L2 in FIG. 9, that is, when the battery capacity of the target vehicle 10X deviates from the standard value L3 to the decreasing side by a predetermined capacity or more, or when the battery capacity of the target vehicle 10X is close to the lower limit L4 within a predetermined capacity.

The display control unit 64 of the display device 60 of the target vehicle 10X causes the display unit 62 to display the received deterioration minimization advice.

Step S25 may be omitted. Further, the order of step S25 and step S26A may be interchanged. That is, the center server 100 may not transmit the battery capacity distribution and the deviation value of the battery deterioration degree, or may transmit the same when the deviation value of the deterioration degree of the battery mounted in the target vehicle 10X exceeds a predetermined value.

According to the above-described embodiment, the deriving unit 130 of the center server 100 generates a battery capacity distribution, and determines the deviation value of the deterioration degree of the battery mounted in the target vehicle 10X on the basis of the target battery capacity and the battery capacity distribution. Therefore, the center server 100 presents the relative deterioration degree of the battery mounted in the target vehicle 10X as a deviation value in comparison with a plurality of batteries mounted in the plurality of vehicles 10 in the market. The presented deviation value is transmitted to the target vehicle 10X and presented to the user via the target vehicle 10X. Therefore, the user can recognize whether his/her usage status is superior or inferior to the average battery usage status in the market when preventing progress of the deterioration of the battery. Therefore, the user can appropriately determine the usage state of the battery.

In the above-described embodiment, the relative deterioration degree presented to the user is a deviation value.

Therefore, the user can easily recognize the difference from other users with respect to the battery usage state. Further, the center server 100 uses the data of the same type of batteries when determining the relative battery deterioration degree. Therefore, since batteries of the same type are compared, the relative deterioration degree can be derived with high accuracy. Further, the center server 100 uses the data of the same type of batteries mounted in the same type of vehicles when determining the relative battery deterioration degree. Therefore, since batteries of the same type mounted in the same vehicle type are compared, the relative deterioration degree can be derived with higher accuracy. Further, the derived battery deterioration degree is displayed and presented on the display unit 62 of the display device 60 of the target vehicle 10X. Therefore, the user can recognize the relative deterioration degree of the battery while riding on the target vehicle 10X.

According to the above-described embodiment, since the change in the battery capacity can be objectively observed, it is possible to motivate the user to appropriately maintain the battery capacity of the vehicle as well as the interior and exterior of the vehicle.

According to the above-described embodiment, since it is possible to ascertain the position of the change in the battery capacity with respect to the standard value or the lower limit, it is possible to present the advice for minimizing the deterioration of the battery capacity to the user at an appropriate timing.

According to the above-described embodiment, since the history of changes in the battery capacity can be ascertained, it is possible to expect a transaction at an appropriate price when buying or selling a vehicle (or a battery).

In the above-described example, the center server 100 transmits the battery capacity distribution and the deviation value of the battery deterioration degree to the target vehicle 10X, but the deviation value of the battery deterioration degree may be calculated in the target vehicle. In this case, the target vehicle 10X calculates the battery deterioration degree on the basis of the detection value of the battery sensor 42, and calculates a deviation value of the battery deterioration degree of the host vehicle on the basis of the battery capacity transmitted from the center server 100 and the calculated battery deterioration degree.

In the above-described embodiment, the "plurality of secondary batteries satisfying a predetermined condition" is the batteries 40 of the same type, but other conditions may be used. For example, the batteries 40 of the same type mounted in the same vehicle type may be used. Further, the "predetermined condition" may be a geographical condition, or the predetermined condition may be another condition, such as batteries mounted in the plurality of vehicles 10 in the market. The "predetermined condition" may be a time condition, such that the time when the battery status information is detected by the battery sensor 42 is from 7:00 to 19:00.

In the above-described embodiment, the "relative deterioration degree" is used as the deviation value, but a degree other than the deviation value may be used as long as it is a relative degree. For example, the relative deterioration degree may be whether it falls within the top 10% of all comparison targets and may be the degree of deviation from the average value or the representative value such as a mode or a median.

In the above-described embodiment, the deterioration degree of the battery 40 mounted in the vehicle 10 is calculated and acquired by the model generation unit 120, but it may be acquired by another method. For example, the vehicle 10 may calculate the battery capacity on the basis of the current value, the voltage value, and the temperature of the battery and transmit the same to the center server 100 as the battery deterioration degree.

In the above-described embodiment, the relative deterioration degree is "presented" via the display unit 62 of the display device 60 mounted on the target vehicle 10X, but may be presented by another method. For example, the relative deterioration degree may be "presented" by displaying on the display unit of an information terminal (mobile terminal) possessed by the user, or may be "presented" by outputting a sound from the target vehicle 10X or the speaker provided in the information terminal.

In the above-described embodiment, the display unit 62 displays the histogram illustrated in FIG. 8, the graph illustrated in FIG. 9, and the deterioration minimization advice, which however may not always be displayed on the display unit 62. For example, whether such information will be displayed may be arbitrarily switched on and off by an operation on the input unit of the user, and such information may be automatically displayed when received from the server and may be displayed by the operation of the dealer when visiting the dealer.

Although the embodiments for carrying out the present invention have been described above using the embodiments, the present invention is not limited to these embodiments, and various modifications and substitutions can be made without departing from the gist of the present invention.

REFERENCE SIGNS LIST

1: Presentation system
10: Vehicle
10X: Target vehicle
12: Motor
50: Communication device
55: Deriving device
60: Display device
62: Display unit
64: Display control unit
70: Charging port
93: Instrument panel
94: Driver's seat
95: Second display device
100: Center server (presentation device)
110: Receiving unit (acquisition unit, second communication unit)
120: Model generation unit (processing unit)
130: Deriving unit (processing unit)
140: Transmitting unit (presentation unit, second communication unit)
200: Charger
NW: Network

The invention claimed is:

1. A vehicle comprising:
a secondary battery configured to supply electric power for travel driving;
a communication device configured to communicate with a server device and upload information on the state of the secondary battery to the server device, the communication device comprising a wireless module capable of connecting to a wireless network;
a display unit configured to display images; and
a display control unit configured to cause the display unit to display an image in which a deterioration degree of the secondary battery with respect to a mileage or the number of years run with respect to the vehicle can be compared with the result of statistically processing the deterioration degree of the secondary batteries with respect to a mileage or the number of years run with respect to other vehicles on the basis of the information that the communication device has received, via the wireless module, from the server device, wherein
the display control unit controls the communication device to transmit a signal, which requests transmitting information for minimizing deterioration of the secondary battery, to the server device when the deterioration degree of the secondary battery with respect to a mileage or a number of the number of years run with respect to the vehicle is worse than a reference in a comparison using results of statistically processing the deterioration degree of secondary batteries with respect to a mileage or a number of the number of years run with respect to the other vehicles.

2. A server device comprising:
a second communication device configured to communicate with a vehicle having a secondary battery that supplies electric power for travel driving, a first communication device that uploads information on the state of the secondary battery to the server device, and a display unit that displays images, the first communication device comprises a first wireless module capable of connecting to a wireless network and the second communication device comprise a second wireless module capable of connecting to the wireless network; and
a processing unit configured to generate information to be displayed as an image on the display unit, the image being an image in which a deterioration degree of the secondary battery with respect to a mileage or the number of years run with respect to a target vehicle can be compared with the result of statistically processing the deterioration degree of secondary batteries with respect to a mileage or the number of years run with respect to other vehicles on the basis of the information that the second communication device has received, via the second wireless module, from a plurality of vehicles and control the second communication device to transmit, via the second wireless module, the generated information to the target vehicle, wherein
the processing unit determines whether the deterioration degree of the secondary battery with respect to the mileage or the number of years run with respect to the target vehicle is worse than a reference as compared to the result of statistically processing the deterioration degree of the secondary batteries with respect to the mileage or the number of years run with respect to the other vehicles and control the second communication device to transmit information for minimizing deterioration of the secondary battery to the target vehicle when the deterioration degree is worse than a reference.

3. A display control method executed using a computer mounted on a vehicle including a secondary battery configured to supply electric power for travel driving, a first communication device comprising a wireless module, the first communication device being configured to communicate with a server device and upload information on the state of the secondary battery to the server device, and a display unit configured to display images, comprising:

generating an image in which a deterioration degree of the secondary battery with respect to a mileage or the number of years run with respect to the vehicle can be compared with the result of statistically processing the deterioration degree of the secondary batteries with respect to a mileage or the number of years run with respect to other vehicles on the basis of the information that the first communication device has received from the server device via the wireless module;

displaying the generated image on the display unit, and controlling the communication device to transmit a signal, which requests transmitting information for minimizing deterioration of the secondary battery, to the server device when the deterioration degree of the secondary battery with respect to a mileage or a number of the number of years run with respect to the vehicle is worse than a reference in a comparison using results of statistically processing the deterioration degree of secondary batteries with respect to a mileage or a number of the number of years run with respect to the other vehicles.

4. A non-transitory computer readable storage medium storing a program for causing a computer mounted on a vehicle including a secondary battery configured to supply electric power for travel driving, a first communication device comprising a wireless module, the first communication device being configured to communicate with a server device and upload information on the state of the secondary battery to the server device, and a display unit configured to display images to execute:

generating an image in which a deterioration degree of the secondary battery with respect to a mileage or the number of years run with respect to the vehicle can be compared with the result of statistically processing the deterioration degree of the secondary batteries with respect to a mileage or the number of years run with respect to other vehicles on the basis of the information that the first communication device has received from the server device via the wireless module;

displaying the generated image on the display unit; and controlling the communication device to transmit a signal, which requests transmitting information for minimizing deterioration of the secondary battery, to the server device when the deterioration degree of the secondary battery with respect to a mileage or a number of the number of years run with respect to the vehicle is worse than a reference in a comparison using results of statistically processing the deterioration degree of secondary batteries with respect to a mileage or a number of the number of years run with respect to the other vehicles.

5. A display control method executed using a computer mounted on a server device including a second communication device configured to communicate with a vehicle having a secondary battery that supplies electric power for travel driving, a first communication device that uploads information on the state of the secondary battery to the server device, the first communication device and the second communication device comprising respective wireless modules, and a display unit that displays images, comprising:

generating information to be displayed as an image on the display unit, the image being an image in which a deterioration degree of the secondary battery with respect to a mileage or the number of years run with respect to a target vehicle can be compared with the result of statistically processing the deterioration degree of secondary batteries with respect to a mileage or the number of years run with respect to other vehicles on the basis of the information that the second communication device has received from a plurality of vehicles;

controlling the second communication device to transmit the generated information to the target vehicle, wherein the controlling comprises facilitating a transmission of the generated information via the respective wireless module of the second communication device; and determining whether the deterioration degree of the secondary battery with respect to the mileage or the number of years run with respect to the target vehicle is worse than a reference as compared to the result of statistically processing the deterioration degree of the secondary batteries with respect to the mileage or the number of years run with respect to the other vehicles and controlling the second communication device to transmit information for minimizing deterioration of the secondary battery to the target vehicle when the deterioration degree is worse than a reference.

6. A non-transitory computer readable storage medium storing a program for causing a computer mounted on a server device including a second communication device configured to communicate with a vehicle having a secondary battery that supplies electric power for travel driving, a first communication device comprises a first wireless module and the second communication device comprises a second wireless module, the first communication device uploads information on the state of the secondary battery to the server device, and a display unit that displays images to execute:

generating information to be displayed as an image on the display unit, the image being an image in which a deterioration degree of the secondary battery with respect to a mileage or a number of years run with respect to a target vehicle can be compared with the result of statistically processing the deterioration degree of secondary batteries with respect to a mileage or the number of years run with respect to other vehicles on the basis of the information that the second communication device has received from a plurality of vehicles;

controlling the second communication device to transmit the generated information to the target vehicle, wherein the controlling comprises facilitating a transmission of the generated information via the second wireless module; and determining whether the deterioration degree of the secondary battery with respect to the mileage or the number of years run with respect to the target vehicle is worse than a reference as compared to the result of statistically processing the deterioration degree of the secondary batteries with respect to the mileage or the number of years run with respect to the other vehicles and controlling the second communication device to transmit information for minimizing deterioration of the secondary battery to the target vehicle when the deterioration degree is worse than a reference.

* * * * *